INVENTOR.
JOHN W. PICKRELL
BY
ATTORNEYS

Oct. 31, 1967  J. W. PICKRELL  3,349,551
HAY RAKE

Filed June 4, 1964  3 Sheets-Sheet 2

INVENTOR.
JOHN W. PICKRELL
BY McLaughlin & Cahill
ATTORNEYS

Oct. 31, 1967  J. W. PICKRELL  3,349,551
HAY RAKE
Filed June 4, 1964  3 Sheets-Sheet 3
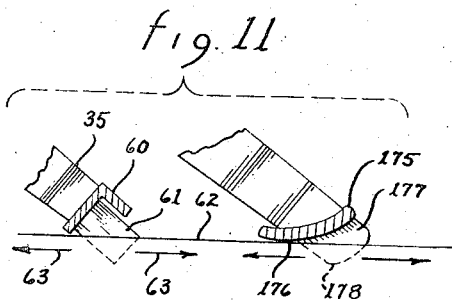
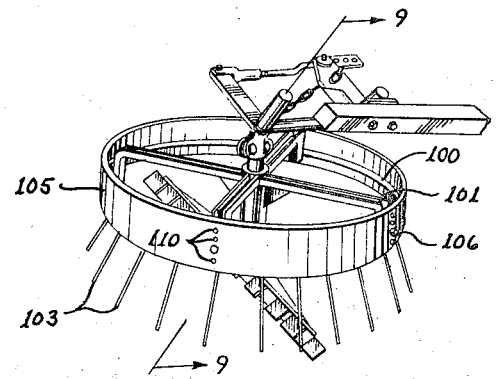
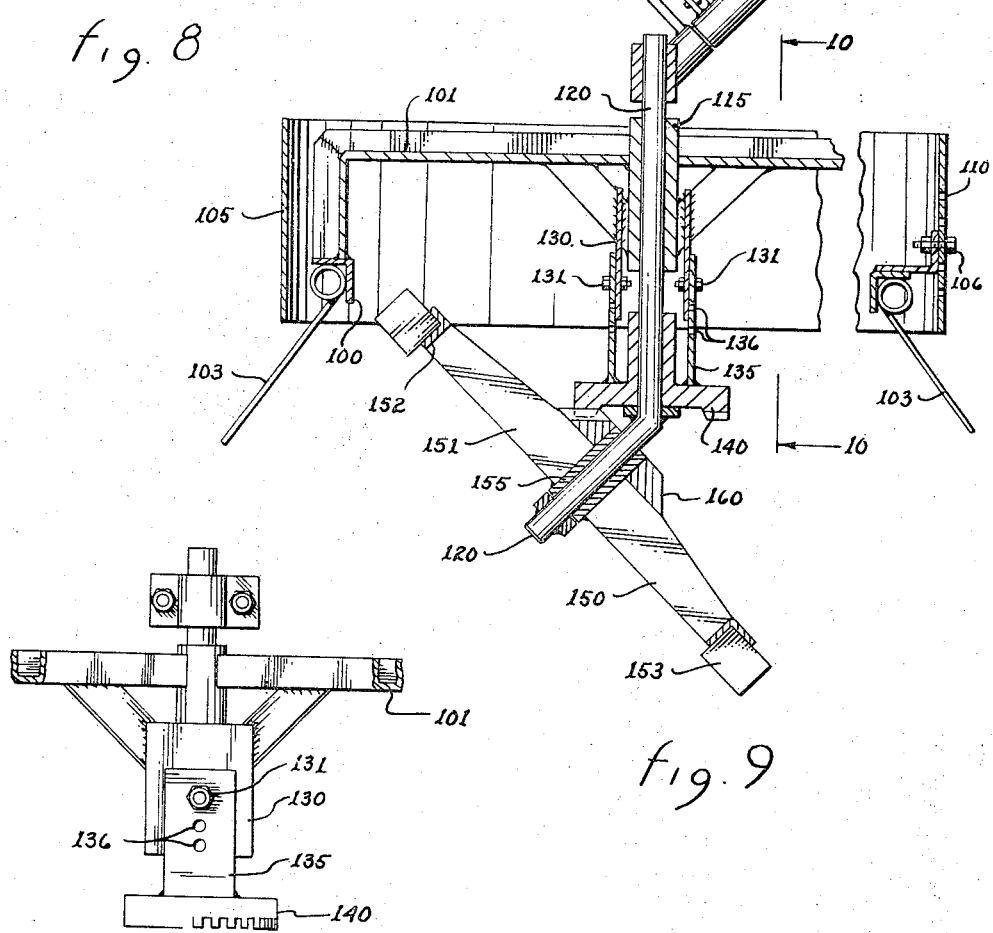
INVENTOR.
JOHN W. PICKRELL
BY *McLaughlin & Cahill*
ATTORNEYS United States Patent Office 3,349,551
Patented Oct. 31, 1967

3,349,551
HAY RAKE
John W. Pickrell, 6237 E. Monterey Way,
Scottsdale, Ariz. 85251
Filed June 4, 1964, Ser. No. 372,635
4 Claims. (Cl. 56—377)

The present invention pertains to hay rakes, and more specifically, to hay rakes of the type known as side delivery hay rakes and those side delivery hay rakes using raking wheels.

Side delivery hay rakes of the type using raking wheels have a number of distinct disadvantages which have been overcome by using inclined raking wheels of the type described and claimed in my co-pending patent application entitled, Side Delivery Rake, Ser. No. 326,710, filed Nov. 29, 1963, and now abandoned. In the foregoing application, it was shown that by inclining the wheels of a wheel rake several startling advantages could be achieved while nevertheless reducing the cost of the rake. The present invention is intended to further improve the operation of the inclined raking wheel side delivery hay rake. The present invention provides improved operation of the inclined wheel rake over a wider variety of terrain and climatic conditions as well as improving the efficiency of hay movement.

Accordingly, it is an object of the present invention to provide an improved inclined raking wheel hay rake.

It is a further object of the present invention to improve the operation of inclined wheel hay rakes by providing a means to drive the individual raking wheels.

It is still another object of the present invention to improve the operation of the inclined wheel hay rake by providing an adjustable shield on each of the raking wheels to enable the wheel rake to handle a greater variety of raking conditions.

It is a further object of the present invention to provide a means for varying the distance of the raking tines above ground.

A further object of the present invention is to provide an inclined wheel hay rake that more gently rakes the hay and provides a more uniform windrow.

Further objects and advantages of the present invention will become apparent to those skilled in the art as the description thereof proceeds.

Briefly, in accordance with one embodiment of the present invention, a plurality of drive wheels are provided each corresponding to one of the raking wheels of an inclined wheel rake. The drive wheels are inclined to vertical and have been found to operate best when they are inclined at an angle from vertical less than the angle of inclination of the raking wheels. In some instances the drive wheels may be vertical although inclined wheels are generally more advantageous. The drive wheel contacts the ground as the rake is being drawn over the ground, and imparts rotation to the raking wheel through a suitable rotation transmission means.

The present invention may best be described by reference to the accompanying drawings in which:

FIGURE 8 is a view of a single raking wheel and drive wheel showing an improved raking wheel construction utilizing a cylindrical shield that is adjustable axially of the rim upon which the raking tines are mounted.

FIGURE 9 is a sectional view of FIGURE 8 taken along line 9—9.

FIGURE 10 is a sectional view of FIGURE 9 taken along line 10—10.

FIGURE 11 is a sectional view of FIGURE 3 taken along line 11—11 showing a sectional view of a circular rim of a drive wheel and a modification thereof.

Figure 1:
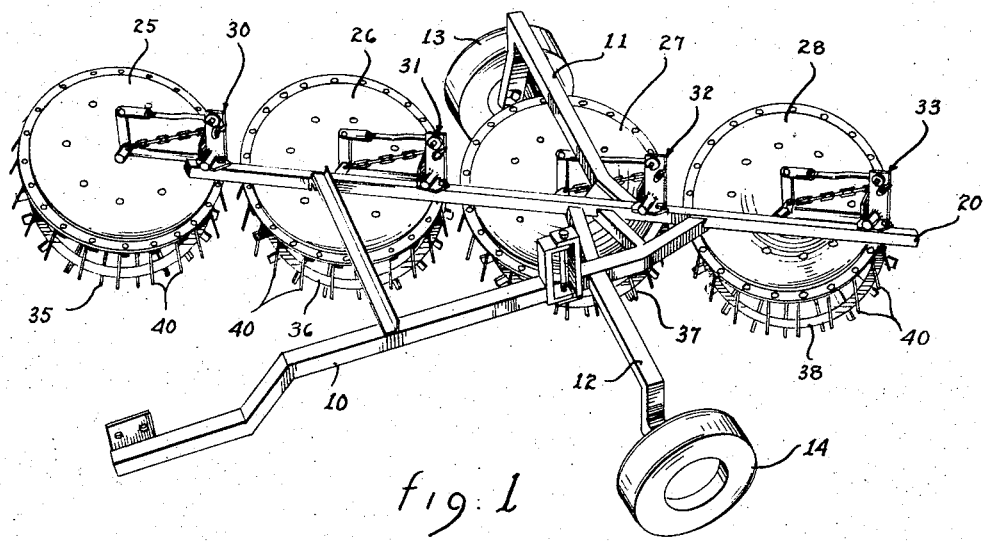
FIGURE 1 is an isometric view of an inclined wheel rake constructed in accordance with the teachings of the present invention.

Referring to FIGURE 1, a hay rake of the inclined raking wheel type is shown including a frame 10 for attaching the rake to a draft vehicle, and cross-frames 11 and 12 for supporting wheels 13 and 14 respectively. A raking wheel mounting member 20 is secured to the frame members 10, 11, and 12 through suitable bracing and is positioned at an angle to the direction of travel. Raking wheels 25, 26, 27, and 28 are mounted on the member 20 through the utilization of parallelogram structures 30, 31, 32, and 33 respectively. The use of parallelograms enables the mounting of the respective raking wheels to permit the raking wheels to raise and lower to follow the contour of the ground while maintaining the same angular relationship relative to the ground. Thus, each of the parallelograms 30–33 permits the shaft of the corresponding raking wheel to raise and lower while securing the shaft in a fixed angular relationship relative to ground. Each of the raking wheels has associated therewith a corresponding drive wheel 35, 36, 37, and 38. The tines 40 of the respective raking wheels extend at an angle to the plane of the wheels toward ground. The drive wheels are arranged so that the ground-engaging portion thereof does not interfere with the tines of the corresponding raking wheels. In the embodiments chosen for illustration, the drive wheels are inclined and positioned such that a horizontal line in the plane of the wheel is substantially parallel to the direction of rake travel. The details of the drive wheel and raking wheel relationship may best be seen by reference to FIGURES 3 and 4. The wheels 13 and 14 are not necessary to the operation of the rake of the present invention. The drive wheels 35–38 may actually support the weight of the rake; however, wheels 13 and 14 may be used for convenient transport of the rake when not in operation.

Figure 3:
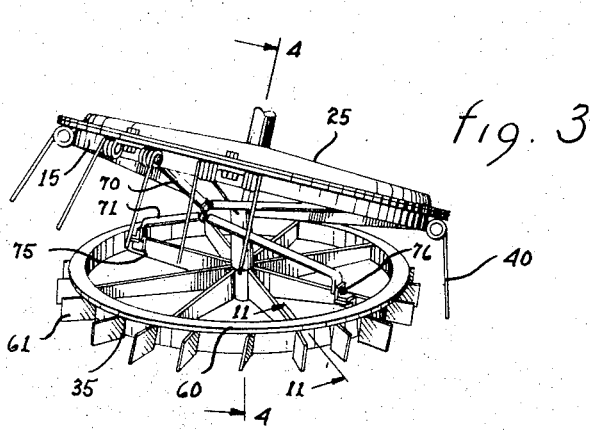
FIGURE 3 is an enlarged view of a portion of the hay rake of FIGURES 1 and 2 showing a single raking wheel connected to a corresponding drive wheel through a rotation transmission means.
Figure 4:
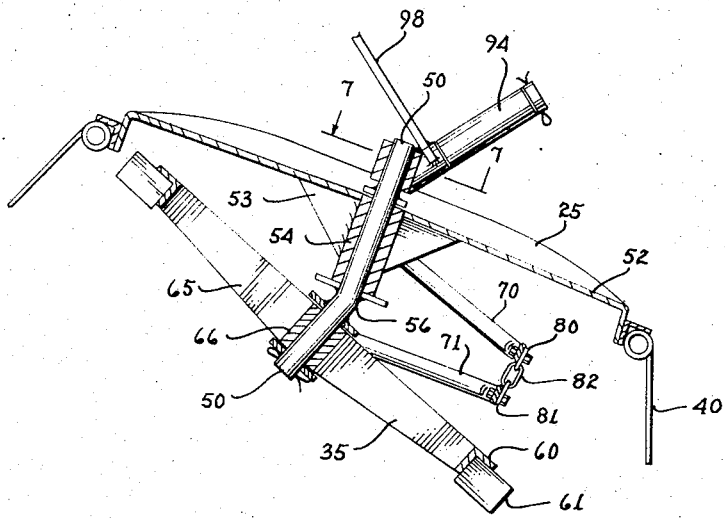
FIGURE 4 is a sectional view of FIGURE 3, slightly enlarged, taken along line 4—4.

Referring to FIGURES 3 and 4, the rake wheel 25 is shown mounted on a shaft 50. The wheel 25 is suitably journalled on the shaft 50 and comprises a circular rim 51 to which the tines 40 are secured. The rim 51, in the embodiment chosen for illustration, is supported about the shaft 50 by a dish-shaped member 52. Support webbing 53 may be added to the member 52 to add structural rigidity and more firmly secure the member 52 to the hub 54 of the wheel 25. The drive wheel 35 is also secured to the shaft 50; however, it will be noted that the shaft 50 is bent forming an elbow 56. The drive wheel 35 is mounted on the shaft 50 below the elbow 56 so that the axis of rotation of the drive wheel 35 forms an angle with, but interesects, the axis of rotation of the raking wheel 25. Horizontal lines in the plane of the drive wheel are parallel to the direction of travel of the rake. The drive wheel includes a circular rim 60 to which a plurality of tab-like extensions 61 have been welded. These extensions, in some instances, may be welded so that they extend radially. The extensions encounter the ground and impart rotation to the drive wheel 35 as the rake is drawn over the ground. These tab-like extensions provide a means to impart rotation by transmitting force tangentially to the wheel while enabling relatively easy lateral slippage to facilitate turning corners. The drive wheel rim 60 is supported by a plurality of spokes 65 extending from a hub 66. The rake wheel and drive wheel are arranged relative to each other so that the lowest point, relative to the ground, of both wheels is on a line parallel to the direction of rake travel.

Rotation imparted to the drive wheel 35 through the motion of the rake over the ground, is transmitted to the raking wheel 25 through the utilization of a pair of wishbone members 70 and 71. The member 70 is pivotally secured to the raking wheel 25, and the member 71 is pivotally secured at 75 and 76 to the drive wheel 35. Any convenient method may be used for pivotally securing the corresponding wishbone members to the rake wheel or drive wheel. In FIGURE 3, simple tabs have been welded to spokes of the drive wheel and pins are used to extend through the wishbone member to the tabs to provide the pivotal attachment. The two wishbone members are then secured together through any convenient flexible means such as the simple expedient shown in FIGURE 4. A small length of chain is secured by attaching one link 80 to the wishbone member 70 and a second link 81 to the wishbone member 71. The intervening link 82 provides a flexible connection between the two wishbone members; obviously, a variety of means may be used to flexibly connect these two members. When the drive wheel 35 is driven by the passage of the rake over the ground, and rotation is imparted to the drive wheel, the rotation is also imparted to the wishbone member 71. The rotational force or torque transmitted to the wishbone member 71 is delivered through the flexible connection consisting of the chain 80, 81, and 82 to the wishbone member 70 and subsequently to the raking wheel 25. Since the drive wheel 35 and raking wheel 25 are not in the same plane, any given point in one of the wheels will not remain the same distance from the other wheel; accordingly, the transmission means comprising the wishbone members enables rotation to be transmitted from the drive wheel to the raking wheel and compensates for the fact that the two wheels are in a different plane since the wishbone members will approach each other as they travel around the upper quadrant of the drive wheel and will recede from each other as they travel the lower quadrant of the drive wheel. The drive wheel is of a proper dimension to provide a predetermined rotational velocity to the raking wheel. This velocity is chosen so that when the tines 40 leave or "lift" out of the hay (as they travel upwardly around the wheel) the linear horizontal velocity relative to the ground of the respective tine is zero. Thus, the hay being raked by the tine will have a velocity of zero when the tine leaves the hay. This arrangement prevents the hay from being thrown or handled roughly by the rake.

Figure 7:
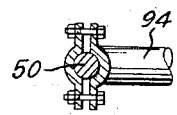
FIGURE 7 is a sectional view taken along line 7—7 of FIGURE 4.
Figure 5:
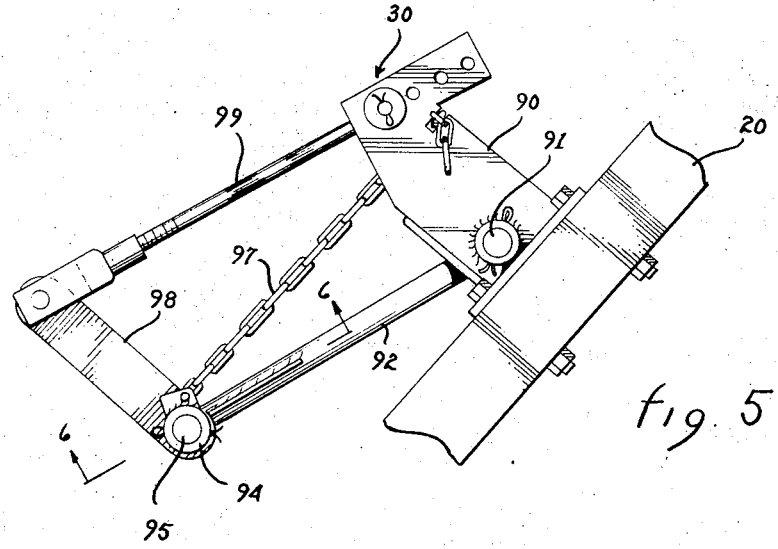
FIGURE 5 is an enlarged view of a portion of the hay rake of FIGURES 1 and 2 showing the means for supporting the shaft mounting the raking wheels and drive wheels.
Figure 6:
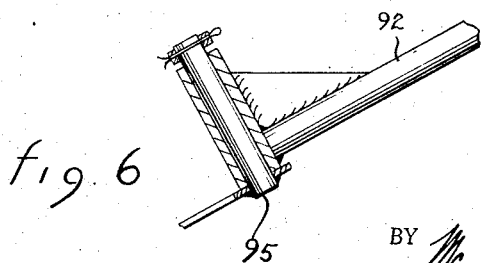
FIGURE 6 is a sectional view taken along line 6—6 of FIGURE 5.

The shaft 50 is supported by the parallelogram 30 and is connected thereto through the utilization of a simple clamping device such as that shown in FIGURE 7. To more clearly understand the operation of the parallelogram 30, reference will now be made to FIGURES 5 and 6. The raking wheel supporting member 20 is inclined at an appropriate angle determined by the angle at which the raking wheels are to be mounted. The parallelogram 30 is bolted to the member 20 and includes a rigid plate 90 for journalling a shaft 91 therein. The shaft 91 is connected to a rod 92 which, in turn, supports a tube 94 for journalling a shaft 95. A strap 98 is secured to the shaft 95 parallel to the plate 90 and is attached at the opposite end thereof to an adjustable bar 99 that is parallel to the bar 92. Thus, it may be seen that the axis of the shaft 95 may be moved anywhere in the plane of the parallelogram defined by the members 90, 92, 98, and 99 while nevertheless maintaining the same angular relationship relative to the ground. The shaft 95 may be welded or otherwise secured to the clamp for grasping the shaft 50 in the manner shown in FIGURE 7. In this manner, the planes of the raking wheels and drive wheels are maintained at a constant angle relative to ground while nevertheless being able to raise and lower to follow the contour of the ground. A chain 97 is provided to enable the respective wheels to be locked above ground thus facilitating the transportation of the rake when it is not in operation.

Figure 2:
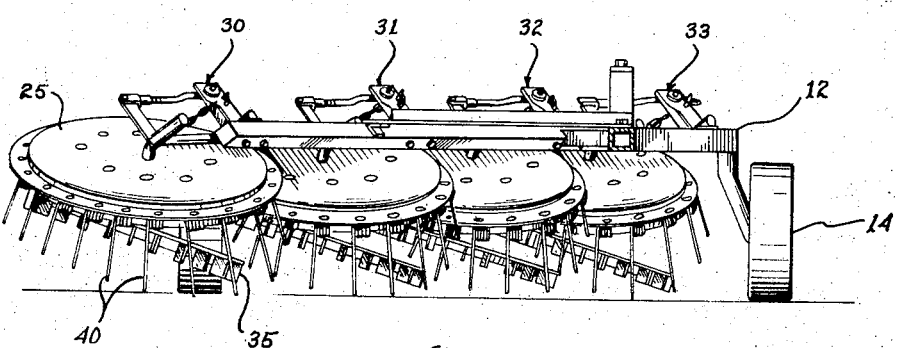
FIGURE 2 is a front elevation view of the hay rake of FIGURE 1.

Referring to FIGURE 8, the improved raking wheel construction of the present invention is shown. The raking wheel includes a circular rim 100 that may be supported on a plurality of spokes 101 or, alternatively, may be supported by a dish-shaped member such as that shown in FIGURES 1 and 2. The tines 103 are secured to the rim 100 and extend at an angle to the plane of the rim. A cylindrical shield 105 is adjustably secured to the rim such as by a plurality of bolts 106. To permit the shield 105 to be raised or lowered (moved axially of the raking wheel rim), a plurality of bolt holes 110 are provided. Thus, depending on the raking conditions and the condition of the hay, the shield 105 may be raised or lowered. The shield presents an abutting surface to the hay being raked by the respective wheel and causes the hay to be compressed preventing loss of hay by falling over the top of the wheel rim; in addition, a more dense windrow may be formed if desired, by lowering the shield relative to the tines. While the embodiment chosen for illustration utilizes a simple bolt and bolt hole arrangement to provide the adjustment, it will be understood by those skilled in the art that a great number of arrangements may be used for permitting the adjustment of the raking wheel shield.

The cylindrical shield is shown in cross-section in FIGURE 9 as is a modification of the rotation transmission means for transmitting rotation from a drive wheel to a raking wheel. Referring to FIGURE 9, the shield 105 is shown secured to the raking wheel circular rim 100 which, in turn, is supported by spokes 101. The spokes radiate from a hub 115 which is journalled on a shaft 120. Tines 103 are secured to the rim 100 and extend downwardly and at an angle relative to the plane of the rim 100. A hub extension 130 (FIGURE 10) extends downwardly and axially of the shaft 120 and includes holes for the admission of bolts 131. A corresponding shaft extension 135, having a plurality of mating holes 136 extend downwardly of the shaft 120 to a ring gear 140. The gear 140 is thus secured co-axially to the raking wheel. A drive wheel 150 is secured to the lower end of the shaft 120 and includes spokes 151, a circular rim 152, and a plurality of extensions 153 similar to those previously described. A hub 155 journals the drive wheel 150 to the shaft 120 and also supports a bevel gear 160 co-axial with the drive wheel 150. The bevel gear 160 meshes with the gear 140 so that the two are at operative engagement and one can drive the other. Thus, when the extensions 153 contact the ground as the rake is being drawn over the ground, the rotation imparted to the drive wheel 150 is transmitted through the gears 160 and 140 to the raking wheel. The height of the raking wheel may be adjusted relative to the ground and relative to the drive wheel by choosing the appropriate bolt holes 136 to mate with the corresponding holes in the hub extension 130. Thus, the adjustability of the height of the raking wheel as well as the adjustability of the cylindrical shield 150 provides substantial versatility to enable the rake to be used over an even wider variety of terrain and conditions while performing at its optimum efficiency.

As described and claimed in my above-mentioned copending patent application, the various angles of the raking wheels may be changed within broad limits; it may also be advantageous to change the relative angular relationship between the drive and raking wheels. It has been found that an angle, from vertical, of 45° for the drive wheels works well and performs advantageously; however, the embodiment shown herein, using a 45° angle, should not be considered limiting to the scope of my invention.

Referring now to FIGURE 11, the circular rim 60 of the drive wheel is shown connected to the spoke 35. The extension 61 contacts the surface of the earth 62 and "digs in" to insure transmission of tangentially-directed force to the drive wheel. Since the extension 61 is radial, the wheel may be moved in a radial direction as shown by the arrows 63 since the extensions 61 will present very little resistance to motion in the radial direction. The modification of the rim configuration 175 presents a smooth curved surface 176 to the surface of the earth to insure that the rim slides smoothly over the earth when the rim is moved radially. Similarly, the extension 177 is provided with rounded corners 178 to reduce resistance to radial motion. The reduced resistance to radial motion permits the rack to turn corners with greater ease.

The operation of the device of the present invention may be described as follows. The rake is attached to a tractive vehicle and drawn to the left as shown in FIGURE 1. The driving wheel rim extensions encounter the ground and impart rotation to the drive wheel as the rake is drawn over the ground. This rotation is transmitted to the corresponding rake wheel and the rake wheel is thus forced to rotate in the direction and at the speed determined by the drive wheel. Thus, if it were desired to cause the rake wheels to rotate faster, a smaller diameter drive wheel could be used to implement the greater rotational velocity. The tines extending from the rake wheels engage the ground, or may be adjusted to clear the ground by an adjustment of the type described in connection with FIGURE 9, and travel transversely of the direction of travel of the rake thereby raking the hay substantially transversely to the direction of travel of the rake. As the rake is drawn through the field, the individual rake wheels follow the contour of the ground while nevertheless maintaining the same angular relationship relative to the ground and relative to the drive wheel. The hay may be compacted into a denser windrow, if such a windrow is necessary, by downwardy adjusting the axial position of the cylindrical shield on the rake wheels; similarly, the height of the rake wheels relative to the drive wheels may be adjusted when conditions necessitate the adjustment to maintain efficiency.

The present invention has been described in terms of specific embodiments and specific structural relationships; however, it will be understood by those skilled in the art that many modifications may be made in the structural relationship and in the elements themselves without departing from the spirit and scope of the present invention.

I claim:
1. In a side delivery wheel rake of the type having inclined raking wheels, the improvement comprising: a circular rim, a plurality of tines extending from said rim at an angle to the plane of said rim, and a cylindrical shield encircling said rim and adjustably attached thereto to permit said shield to be moved axially of said rim in accordance with raking conditions.

2. In a side delivery rake of the type having inclined raking wheels, the improvement comprising:
   (a) a plurality of earth-contacting drive wheels each corresponding to one of said raking wheels,
   (b) each of said drive wheels inclined at an angle to vertical,
   (c) means for transmitting rotation from each of said drive wheels to each corresponding one of said raking wheels, and
   (d) said raking wheels comprising:
      (1) a circular rim,
      (2) a plurality of tines extending from said rim at an angle to the plane of said rim,
      (3) a cylindrical shield encircling said rim and adjustably attached thereto to permit said shield to be moved axially of said rim in accordance with raking conditions.

3. In a side delivery rake of the type having inclined raking wheels, the improvement comprising:
   (a) a plurality of earth-contacting drive wheels each corresponding to one of said raking wheels,
   (b) each of said drive wheels inclined at an angle to vertical, said angle being less than the angle of inclination of said raking wheels,
   (c) means for transmitting rotation from each of said drive wheels to each corresponding one of said raking wheels, and
   (d) said raking wheels comprising:
      (1) a circular rim,
      (2) a plurality of tines extending from said rim at an angle to the plane of said rim,
      (3) a cylindrical shield encircling said rim and adjustably attached thereto to permit said shield to be moved axially of said rim in accordance with raking conditions.

4. In a side delivery wheel rake of the type having inclined raking wheels, the improvement comprising:
   (a) a plurality of earth-contacting drive wheels each corresponding to one of said raking wheels each of said drive wheels including:
      (1) a circular rim having a diameter less than the diameter of said raking wheels,
      (2) a plurality of extensions secured to said rim for contacting the ground and imparting rotation to said drive wheel,
      (3) means securing said drive wheel beneath the corresponding rake wheel with the axis of said drive intersecting the axis of said corresponding rake wheel,
   (b) each of said drive wheels inclined at an angle to vertical, said angle being different than the angle of inclination of said raking wheels,
   (c) means for transmitting rotation from each of said drive wheels to each corresponding one of said raking wheels, and
   (d) said raking wheels comprising:
      (1) a circular rim,
      (2) a plurality of tines extending from said rim at an angle to the plane of said rim,
      (3) a cylindrical shield encircling said rim and adjustably attached thereto to permit said shield to be moved axially of said rim in accordance with raking conditions.

References Cited

FOREIGN PATENTS

| | | |
|---|---|---|
| 553,019 | 12/1956 | Belgium. |
| 1,352,741 | 1/1964 | France. |
| 1,361,205 | 4/1964 | France. |

ABRAHAM G. STONE, *Primary Examiner.*

P. A. RAZZANO, *Assistant Examiner.*